(12) United States Patent
Mermoud et al.

(10) Patent No.: US 12,695,676 B2
(45) Date of Patent: Jul. 28, 2026

(54) SOFTWARE DEVELOPMENT KIT FOR INTEGRATING APPLICATIONS AND COGNITIVE NETWORKS

(71) Applicant: Cisco Technology, Inc., San Jose, CA (US)

(72) Inventors: Grégory Mermoud, Venthône (CH); Jean-Philippe Vasseur, Combloux (FR); Pierre-André Savalle, Rueil-Malmaison (FR); Michal Wladyslaw Garcarz, Cracow (PL); Eduard Schornig, Haarlem (NL)

(73) Assignee: Cisco Technology, Inc., San Jose, CA (US)

( * ) Notice: Subject to any disclaimer, the term of this patent is extended or adjusted under 35 U.S.C. 154(b) by 12 days.

(21) Appl. No.: 18/598,805

(22) Filed: Mar. 7, 2024

(65) Prior Publication Data

US 2025/0286788 A1 Sep. 11, 2025

(51) Int. Cl.
*H04L 41/147* (2022.01)
*H04L 41/0816* (2022.01)
(Continued)

(52) U.S. Cl.
CPC ........ *H04L 41/147* (2013.01); *H04L 41/0816* (2013.01); *H04L 41/5067* (2013.01); *H04L 45/308* (2013.01)

(58) Field of Classification Search
CPC .............. H04L 41/147; H04L 41/0816; H04L 41/5067; H04L 45/308
See application file for complete search history.

(56) References Cited

U.S. PATENT DOCUMENTS 11,347,549 B2 * 5/2022 Tang ..................... G06F 9/5061
11,715,051 B1 8/2023 Baskaran et al.
(Continued)

FOREIGN PATENT DOCUMENTS

EP 3672154 A1 6/2020
WO 2022037627 A1 2/2022

OTHER PUBLICATIONS

Nichols K., et al., "Definition of the Differentiated Services Field (DS Field) in the IPv4 and IPv6 Headers", The Internet Society, Network Working Group, Request for Comments 2474, Dec. 1998, 20 Pages.

(Continued)

*Primary Examiner* — Philip C Lee
(74) *Attorney, Agent, or Firm* — Merchant & Gould P.C.; Kenneth J. Heywood

(57) ABSTRACT

In one embodiment, a device provides a software development kit that includes a set of functions for inclusion in an application developed using the software development kit to communicate with a cognitive network service in a network. The cognitive network service receives application telemetry data from the application sent via the set of functions from the software development kit. The cognitive network service uses the application telemetry data from the application and network telemetry from the network as input to a prediction model to predict a quality of experience metric for the application. The cognitive network service provides, based on the quality of experience metric predicted by the prediction model, a configuration change recommendation to the application via the set of functions.

20 Claims, 9 Drawing Sheets

(51) Int. Cl.
　　　*H04L 41/5067*　　　(2022.01)
　　　*H04L 45/302*　　　(2022.01)

(56) References Cited

U.S. PATENT DOCUMENTS

| | | | | |
|---|---|---|---|---|
| 12,034,605 | B1 * | 7/2024 | Vasseur | H04L 41/147 |
| 12,047,425 | B1 * | 7/2024 | Schornig | H04L 41/147 |
| 12,063,161 | B1 * | 8/2024 | Garcarz | H04L 43/08 |
| 2008/0155087 | A1 | 6/2008 | Blouin et al. | |
| 2018/0324204 | A1 * | 11/2018 | McClory | G06F 9/5027 |
| 2021/0004311 | A1 * | 1/2021 | Bhide | G06F 11/3608 |
| 2022/0091837 | A1 | 3/2022 | Chai et al. | |
| 2022/0150151 | A1 * | 5/2022 | Ramamoorthy | H04L 41/16 |
| 2023/0327971 | A1 * | 10/2023 | Kolar | H04L 43/12 |
| | | | | 709/224 |
| 2025/0119369 | A1 * | 4/2025 | Zhu | H04L 43/08 |

OTHER PUBLICATIONS

Wikipedia: "Cgroups", Wikipedia, The Free Encyclopedia, retrieved from https://en.wikipedia.org/wiki/Cgroups#:~:text=A%20control%20group%20(abbreviated%20as,limits%20from%20its%20parent%20group, last edited on Dec. 13, 2023, 7 Pages.

Wikipedia: "Out of Memory", Wikipedia, The Free Encyclopedia, retrieved from https://en.wikipedia.org/wiki/Out_of_memory, last edited on Feb. 24, 2024, 3 Pages.

* cited by examiner

SOFTWARE DEVELOPMENT KIT FOR INTEGRATING APPLICATIONS AND COGNITIVE NETWORKS

TECHNICAL FIELD

The present disclosure relates generally to computer networks, and, more particularly, to a software development kit (SDK) for integrating applications and cognitive networks.

BACKGROUND

Traditionally, network service level agreement (SLA) thresholds have been used as a proxy for the true quality of experience (QoE) of an online application from the perspective of the end user. In other words, it is assumed that if the SLA is being violated (e.g., packet loss exceeds the SLA threshold), the QoE of the application is also degraded and users of the application will have unsatisfactory experiences with the application. While this may hold true in clear situation of network impairment, some of the more complex types of impairments could go unnoticed by network systems. In addition, these approaches also fail to take into account the behaviors and actions of the users and of the application itself, which can also affect the true QoE.

However, the strict layering of the Open Systems Interconnection (OSI) model means that application developers do not have any way of providing feedback to the network about the performance and operation of the application. Rudimentary attempts to unite the application layer and network layer, such as differentiated services code point (DSCP), have focused on simply flagging traffic with a priori indicators of the type of service required by the application. Without a mechanism to fully unite the application and network layers, though, it would be impossible to predict the true QoE of the application for purposes of network control.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
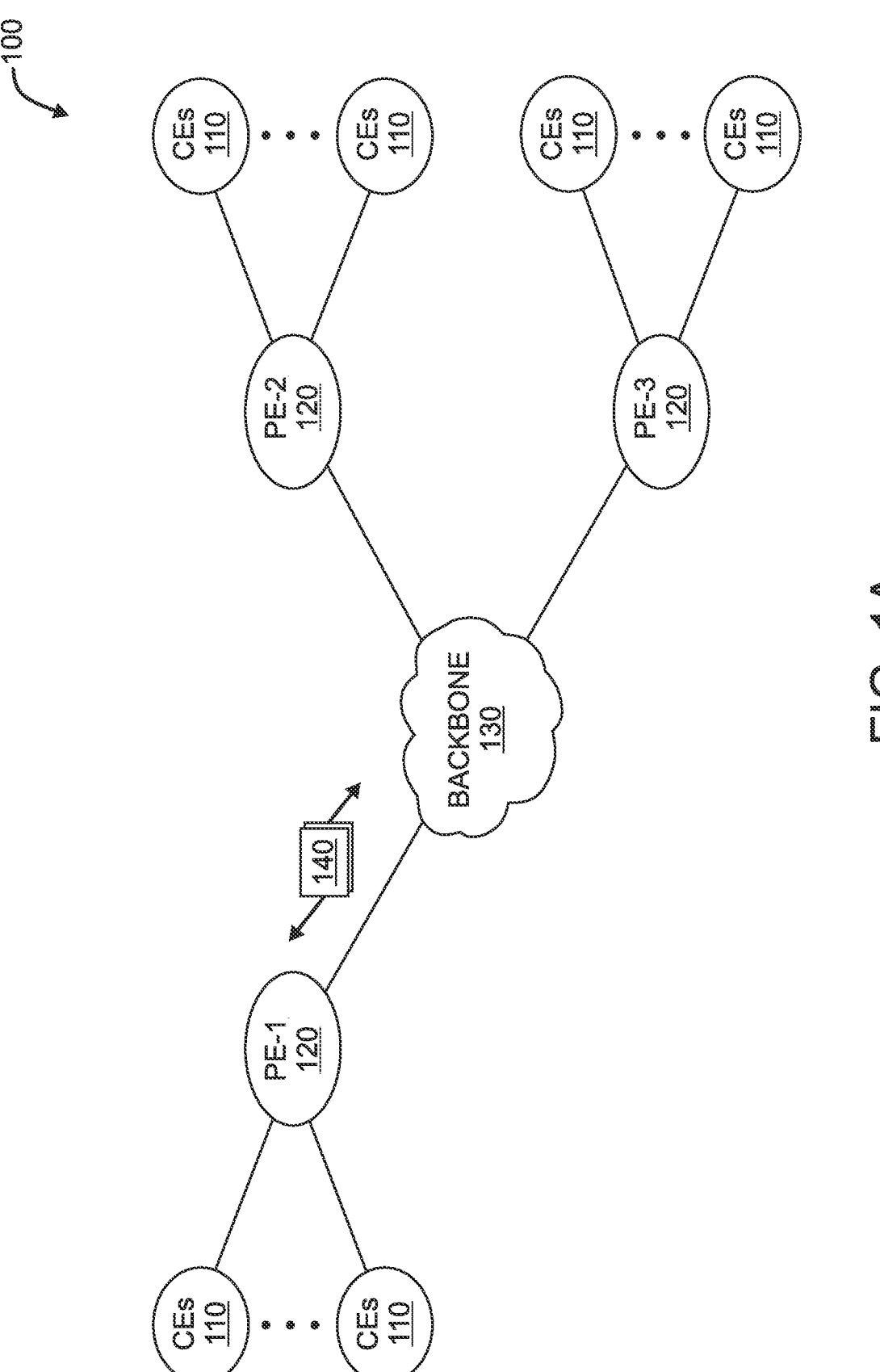
FIGS. 1A-1B illustrate an example communication network.

According to one or more embodiments of the disclosure, a device provides a software development kit that includes a set of functions for inclusion in an application developed using the software development kit to communicate with a cognitive network service in a network. The cognitive network service receives application telemetry data from the application sent via the set of functions from the software development kit. The cognitive network service uses the application telemetry data from the application and network telemetry from the network as input to a prediction model to predict a quality of experience metric for the application. The cognitive network service provides, based on the quality of experience metric predicted by the prediction model, a configuration change recommendation to the application via the set of functions.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
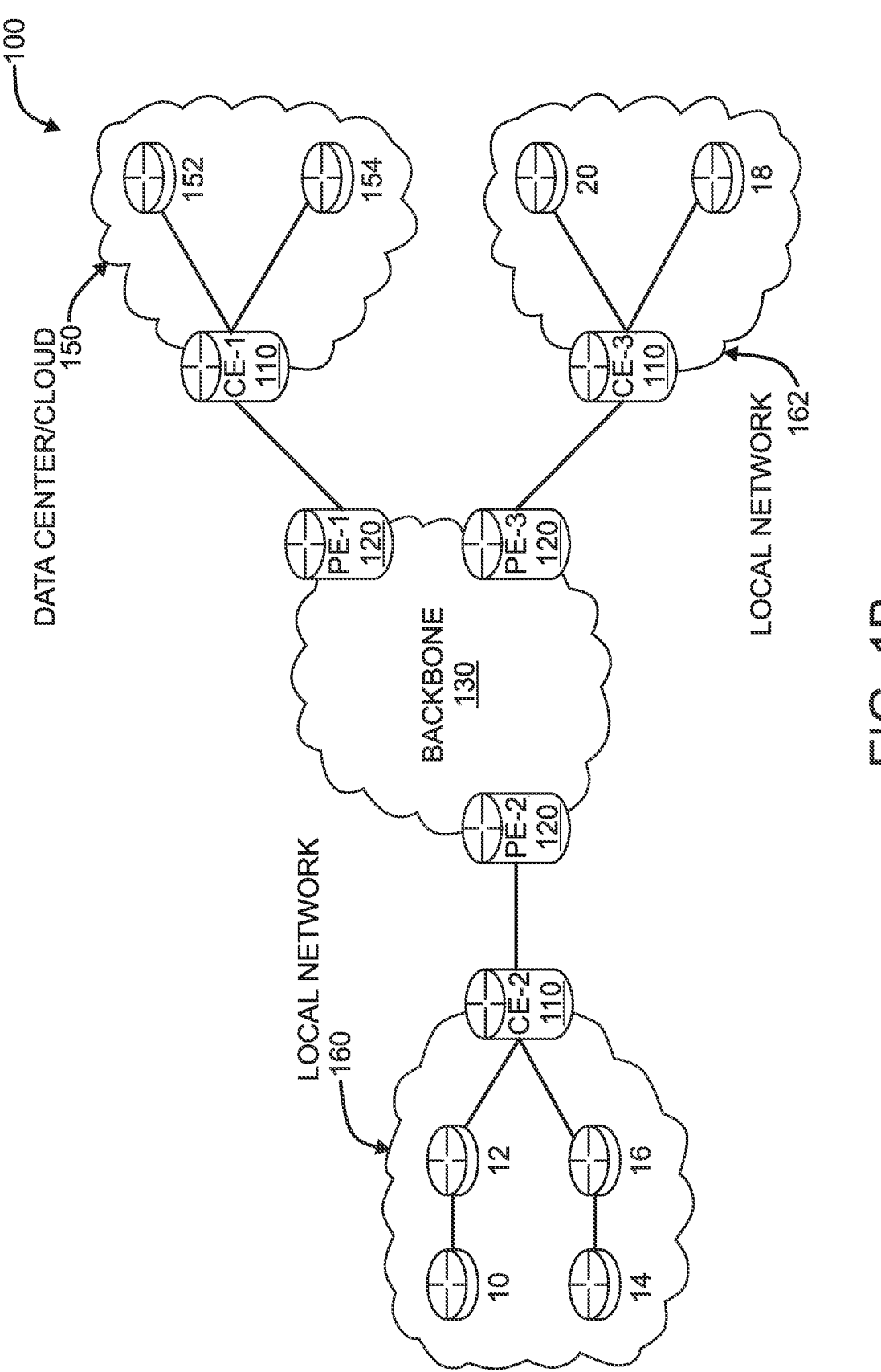

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
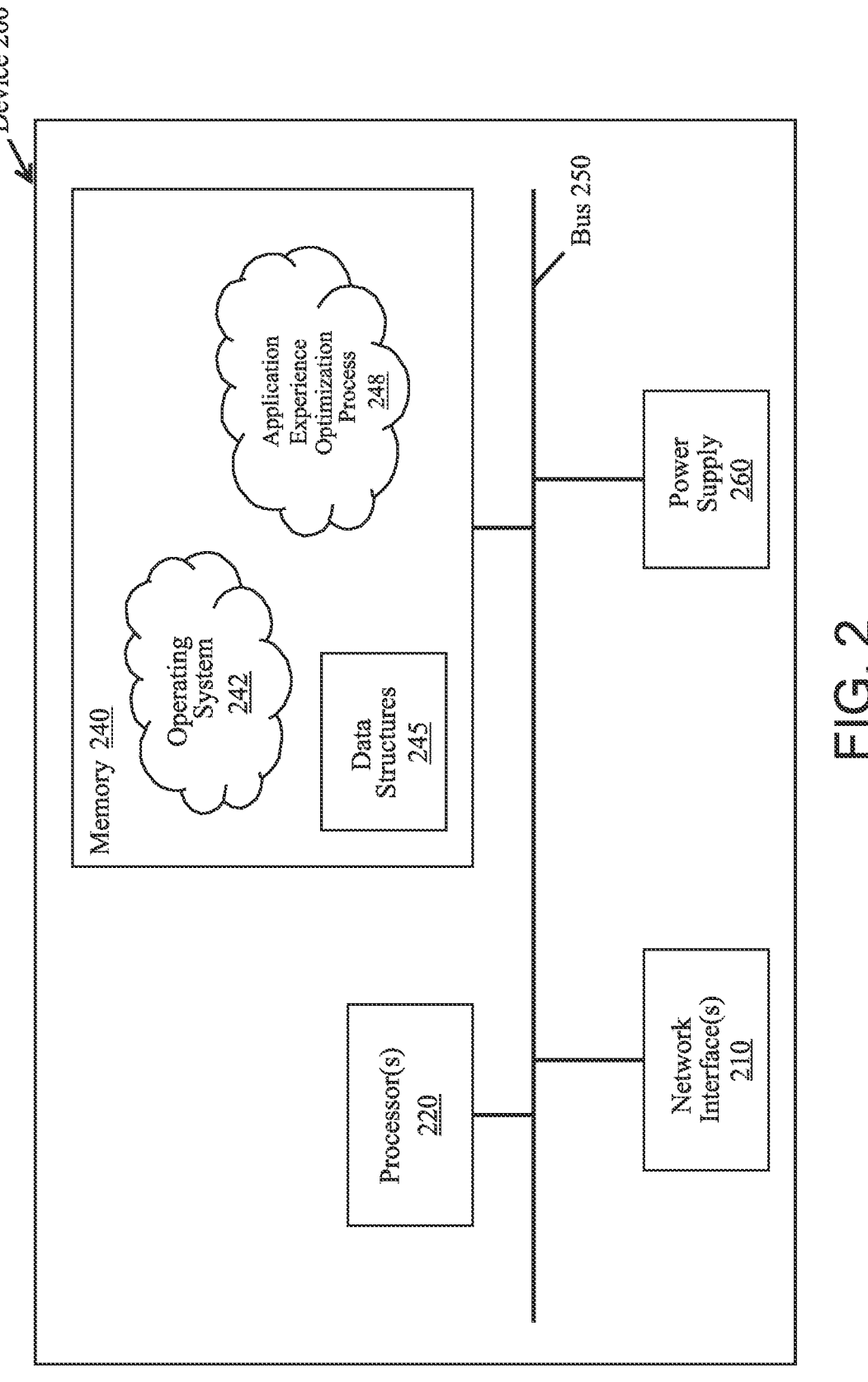
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, application experience optimization process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, application experience optimization process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QOS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
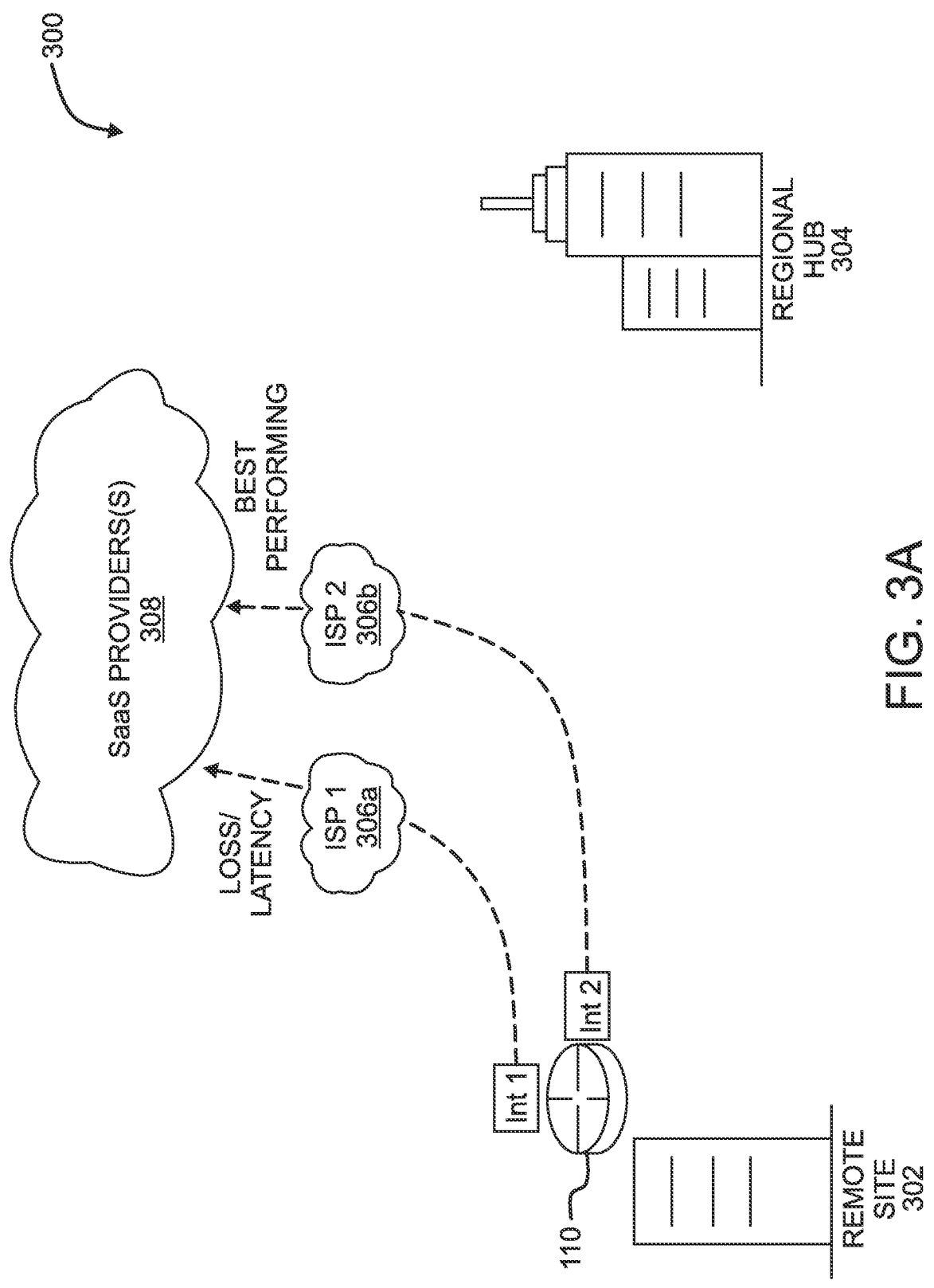
FIGS. 3A-3B illustrate example network deployments.
Figure 3B:
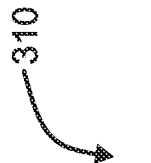

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
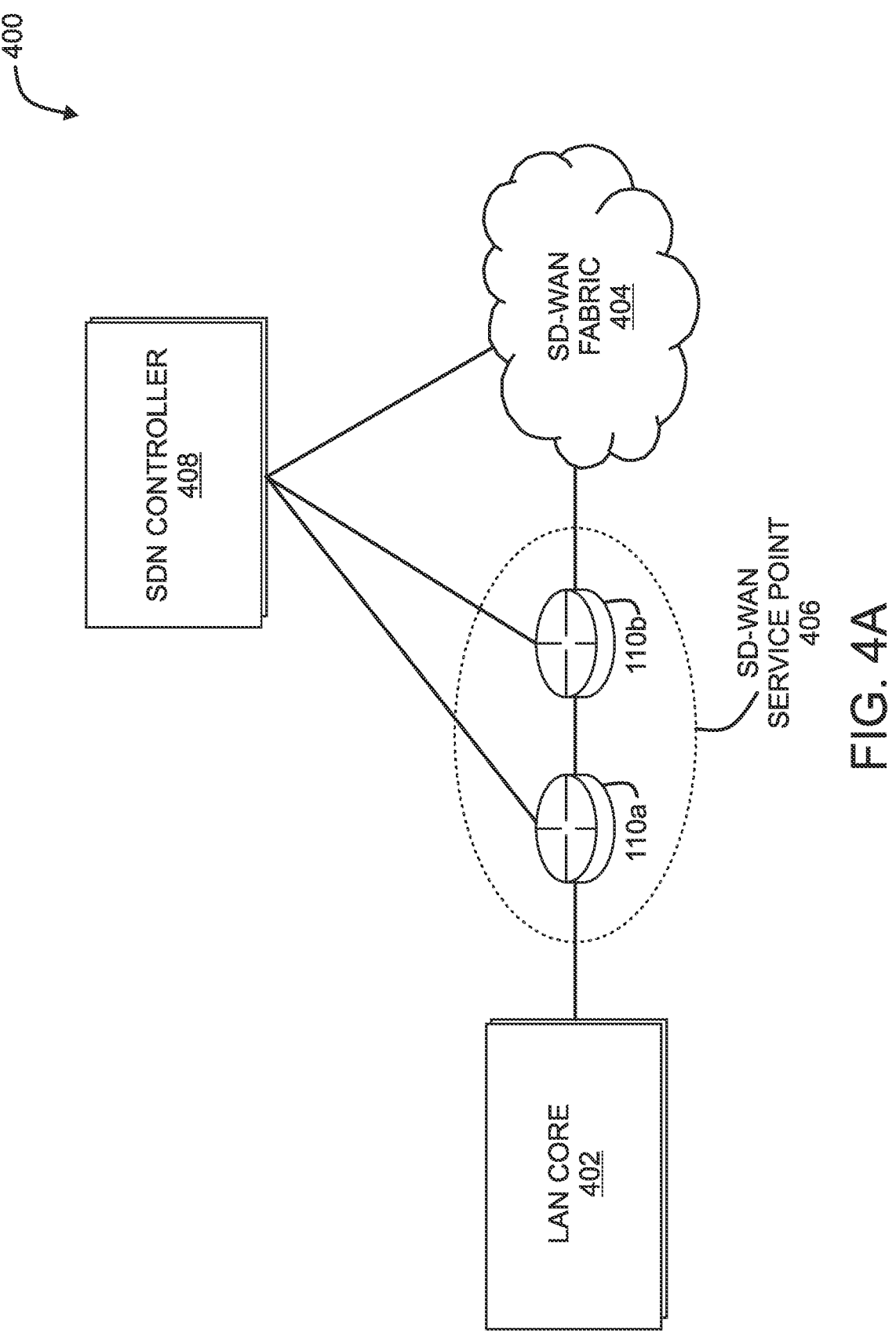
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
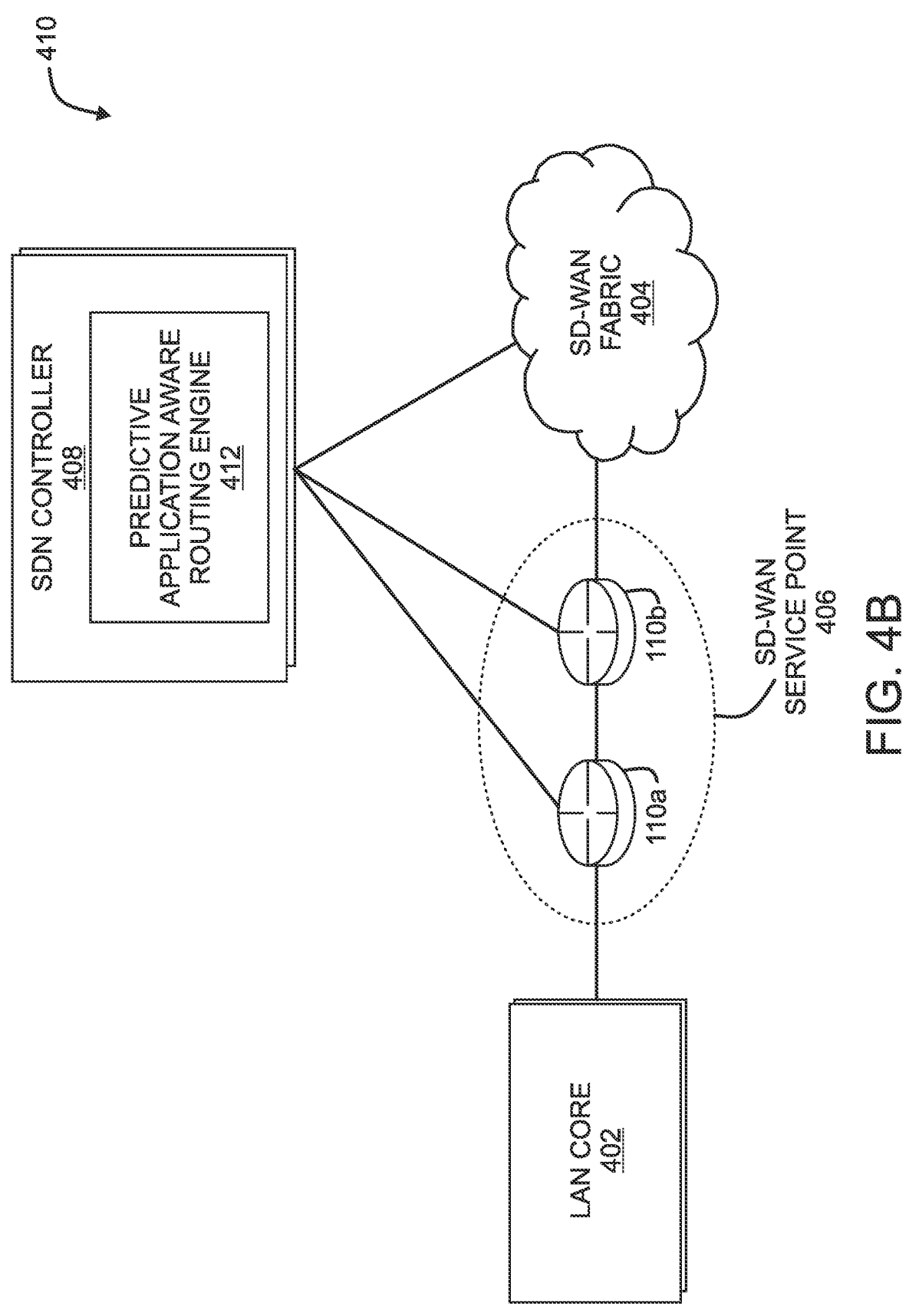

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g., often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g., PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, cognitive networks represent an evolution over existing networking techniques by focusing on the true user experience/QoE of an online application, rather than attempting to infer this information from proxy information, such as SLA violations (e.g., real SLA violations detected in the network or SLA violations predicted by a predictive network system). The scope of cognitive networks is also not specific to just voice and video applications and can be expanded to other types of applications, as well.

Because of the strict layering of the OSI model, though, application developers have no way of providing feedback to the network about the quality of service observed at the application layer. Rudimentary attempts to unite the application layer and network layer, such as differentiated services code point (DSCP), have focused on simply flagging traffic with a priori indicators of the type of service required by the application. Without a mechanism to fully unite the application and network layers, though, it would be impossible to predict the true QoE of the application for purposes of network control.

—An SDK for Integrating Applications and Cognitive Networks—

The techniques herein allow application developers to improve the performance of their application by performing bidirectional communication with a cognitive network. In some aspects, the application can provide the network with visibility into the key metrics that govern the performance of their application. In further aspects, the application can also expose key parameters (e.g., codec parameters, bitrates, TCP options, etc.). The network control mechanisms can then use this information for purposes of optimizing the network.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device provides a software development kit that includes a set of functions for inclusion in an application developed using the software development kit to communicate with a cognitive network service in a network. The cognitive network service receives application telemetry data from the application sent via the set of functions from the software development kit. The cognitive network service uses the application telemetry data from the application and network telemetry from the network as input to a prediction model to predict a quality of experience metric for the application. The cognitive network service provides, based on the quality of experience metric predicted by the prediction model, a configuration change recommendation to the application via the set of functions.

Figure 5:
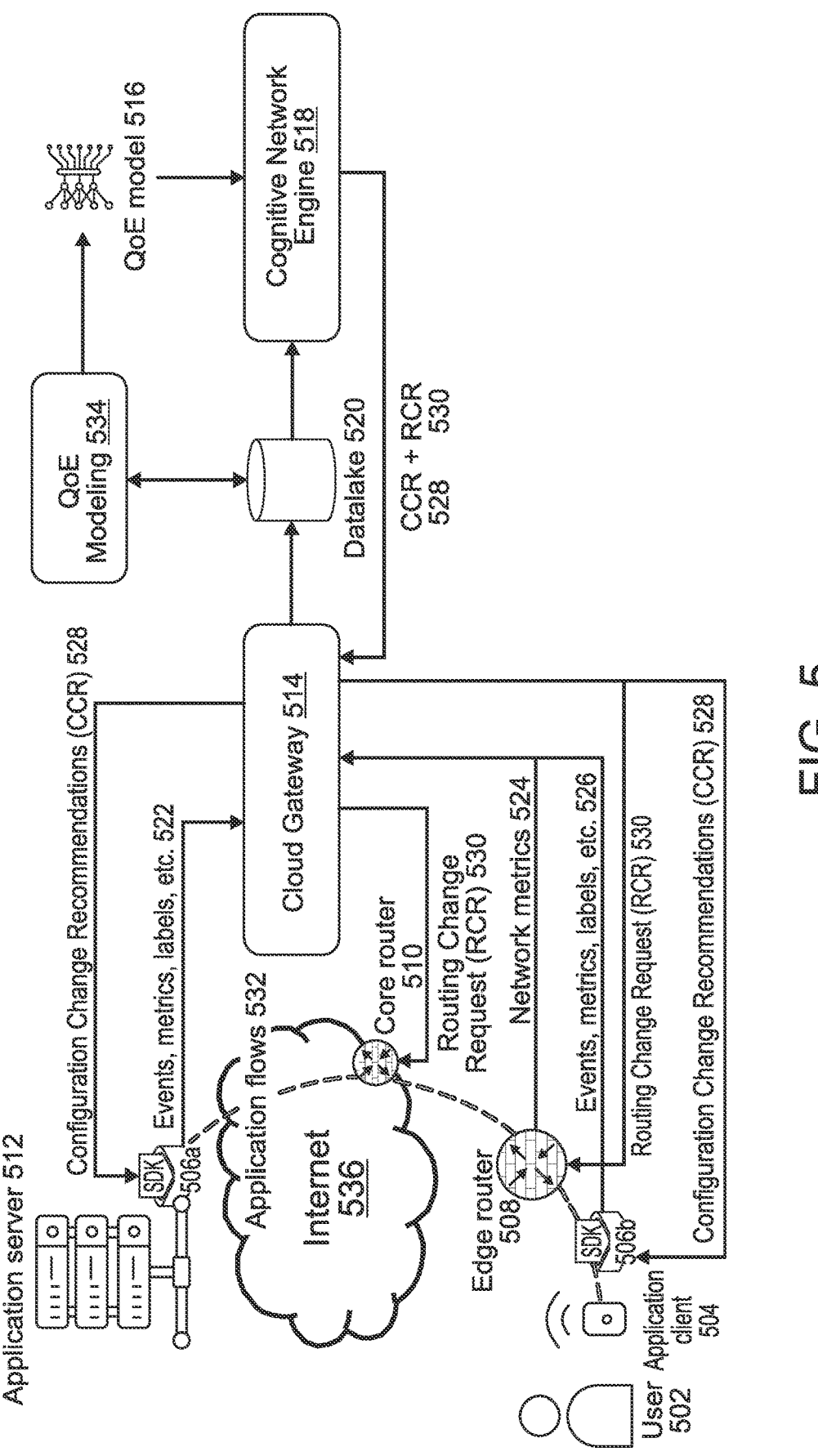
FIG. 5 illustrates an example architecture for using a software development kit (SDK) to integrating applications and cognitive networks.

Operationally, FIG. 5 illustrates an example architecture 500 for using a software development kit (SDK) to integrating applications and cognitive networks, in various implementations. As noted above, a cognitive network represents an evolution over traditional predictive networking approaches that seek to optimize the QoE of an application by concentrating only on the network layer. Instead, cognitive networking approaches take a cross-layer approach that considers telemetry at both the application layer and at the network layer (and possibly other layers, as well).

As shown in FIG. 5, assume that there is a user 502 that operates an application client 504 to access an online application served by application server 512. To do so, application client 504 and network metrics 524 may exchange application flows 532 via a WAN, such as the Internet 536. Thus, application flows 532 may flow through any number of networking devices such as an edge router 508 at the edge of the local network in which application client 504 is located, core router 510 (e.g., a PE router of the ISP for user 502), or the like.

Also as shown, assume that there is a cloud gateway 514 for a cognitive network service that supports the cognitive networking techniques described previously. For instance, cloud gateway 514 may be responsible for handling the registration, authentication, and authorization of application endpoints (e.g., application client 504, application server 512, etc.), as well as the collection of various telemetry from both the application and from the network. More specifically, cloud gateway 514 may collect any or all of the following information:

Network metrics 524—such telemetry may be generated by one or more routers or other networking devices in the network (e.g., edge router 508 associated with application client 504, etc.) or any other device in the network. In general, network metrics 524 may indicate network performance metrics such as path loss, latency, jitter, etc. In various embodiments, network metrics 524 may also include traceroute information captured by agents (e.g., ThousandEyes agents, etc.) executed by these devices performing path tracing/probing.

Application telemetry 522—In addition to obtaining network metrics 524, cloud gateway 514 may also obtain telemetry data generated by the online application of interest, itself. For instance, such telemetry may include data regarding events (e.g., specific user interactions, the number of participants in a video conference, etc.), application metrics (e.g., concealment time, etc.), labels, etc. captured by the application itself. In some instances, application telemetry 522 may also include user-provided satisfaction ratings regarding the application (e.g., ground-truth QoE labels).

Client endpoint telemetry 526—This information can be collected either directly within the application and/or via an outside mechanism such as an endpoint agent or chatbot, etc. For instance, client endpoint telemetry 526 may include events, metrics, labels, etc. regarding the operation of the application at application client 504 (e.g., resource usage information for application client 504, actions by user 502, etc.). In some instances, client endpoint telemetry 526 may also include satisfaction ratings from user 502 regarding the application. Such feedback may take any number of forms, such as, but not limited to, ratings on a predefined scale (e.g., 0-5 stars), binary values (e.g., a thumbs up or thumbs down rating), textual feedback, or any other form of feedback indicative of their experience.

In accordance with the teachings above, cloud gateway 514 may store application telemetry 522, network metrics 524, and/or client endpoint telemetry 526 in a datalake 520 of the cognitive network service. Such information can be used by a QoE modeling engine 534 of the service that trains a QoE model 516 to predict the true QoE of the application based on the information obtained by cloud gateway 514. In some implementations, QoE model 516 may provide its predictions to a cognitive network engine 518 of the service that generates corrective measures such as configuration change recommendations 528 for the application (e.g., to be implemented at application server 512 and/or at application client 504). In further instances, other corrective measures from cognitive network engine 518 may include a routing change request 530 that requests that a router or other networking device, such as edge router 508, reroute application flows 532, in an attempt to improve the QoE of the application.

According to various embodiments, architecture 500 may leverage a specialized software development kit (SDK) to support cognitive networking and is also referred to herein as a CogNet SDK. In general, the CogNet SDK may be available in a variety of programming languages to developers of the application. For purposes of illustration, code samples are provided below in Python, but other suitable programming languages could also be supported. In various implementations, the CogNet SDK may include a set of functions that allow the application developers to configure the application to perform two distinct actions:

1. Provide visibility to the networking domain into their application: this allows the developer to emit metrics, events, QoE scores, or the like, which can then be consumed by network controllers, the cognitive networking service of the network, etc.
2. Expose control parameters to the network: this allows the application and the underlining network to operate in concert, to deliver the best experience to the end user, such as user 502.

The SDK can be integrated into either, or both of:

1. The server-side application, such as API backends, CDN nodes, video conferencing media servers, etc. For instance, as shown, SDK 506a may be configured with specific machine-to-machine credentials for reporting application telemetry 522 (e.g., as in client credential flows in OAuth 2.0). The application can either report parameters that apply to the server-side application directly or help report metrics for users that cannot be reported directly by the corresponding client-side applications.
2. Client-side applications directly, such as in a video conferencing client, or in a web application's browser code. For instance, SDK 506b can be configured with appropriate identity information (e.g., obtained through an appropriate OAuth 2.0 user authentication flow) for purposes of enabling the client application on application client 504 to report client endpoint telemetry 526.

Both types of applications are referred to as application clients in the following.

By way of example, the SDK may be setup as follows:
from cognetsdk import api
api.init( )

In some instances, the SDK establishes a connection to a cloud gateway 514, by default, to which it will send all of the telemetry such as metrics, events, etc. To this end, the SDK may also include capabilities such as buffering, error handling, authentication and encryption, and the like, to support this telemetry reporting. In further cases, the SDK can also be configured to automatically discover a local cognitive network gateway to which it is to send its telemetry data, such as by using a service discovery protocol. This allows deploying a cognitive network gateway at the level of an enterprise network for specific use cases where a centralized cloud gateway, such as cloud gateway 514, cannot be used.

As would be appreciated, application developers often instrument their code with metrics or events that reflect the health of the application or its overall performance. The network is often a big influencer in the performance of the application, especially in collaboration applications (where client endpoints must communicate with a server or in a peer-to-peer fashion), web applications (where the application runs in a browser), or cloud-connected applications (e.g., where a desktop or mobile application communicates with a remote cloud endpoint). Oftentimes, the Internet or a private network lies between different components of the application (client/server), into which the application developer has no visibility and no way of influencing.

The CogNet SDK allows for the exposure of telemetry such as application events and metrics that will be consumed by the cognitive network service, such as for use as features for QoE model 516 to make its predictions.

Below illustrates an example code snippet to report an in-application event to the cognitive network service:

```
#Emit an event that the connection to the server has been
    lost.
api.event.emit(
    name="connection-lost",
    details="Connection to the primary server 2.3.4.5 has
        been lost",
    props=["retries: 5", "wait_ms: 2000", "severity: 1"]
    )
```

Below illustrates an example code snippet to report an in-application metric to the cognitive network service:

```
#Emit the response time of the server as a metric.
api.metric.emit(
    name="response.time",
    unit="ms",
    value=25
    )
```

Furthermore, the SDK allows the application developer to transmit directly QoE scores/user-provided satisfaction ratings (both obtained directly from the user and calculated via a handcrafted heuristic) to the cognitive network service as labels. These will serve as the objective to be optimized by the network. Below illustrates an example code sample to report the satisfaction ratings to the cognitive network service:

```
#Emit a subjective evaluation from the user (thumbs
    up/down).
api.qoe.emit(
    kind="user", #'user' for user, 'heuristic' for rule-based
    value=True #boolean for user feedback, float for heu-
        ristic
    )
```

In one implementation, the CogNet SDK could use the standard OpenTelemetry protocols for communication with cloud gateway 514 as detailed below.

As would be appreciated, developers must make decisions regarding their use of external resources (e.g., storage, memory, CPU, and network). Classically, such decisions are made in a top-down manner: the contract between the resource and the application goes one-way (i.e., the application makes a request, and the resource tries to fulfill it), and the only way for the resource to influence the application is by blocking or delaying its service (which is a form of back-pressure). Most resource management mechanisms in operating systems either "fool" the application in an ideal-ized view of the underlying resource (e.g., virtual memory, hardware virtualization, TCP sockets) or perform hard top-down constraints (e.g., OOM Killer in Linux, which termi-nates processes when the system runs out of memory, or cgroups in Linux), but they do not attempt to be cooperative in any shape or form.

The techniques herein change this paradigm as far as the network is concerned. Instead, they allow an application developer to expose some controllable parameters that the network is allowed to influence. For instance, a developer of a video conferencing application could use the code example below to cause the application to report the choice of the codec for a meeting to the cognitive network service:

```
#Expose the type of codec used by a video conferencing
    application
api.control.expose(
    name="codec",
    options=["silk", "opus"],
    callback=change_codec
```

As noted previously, the cognitive network service can also opportunistically send a configuration change recom-mendation 528, to change the operation of the application itself. For instance, in the case of a video conferencing application, the recommendation could be to switch the application to using a different codec, which triggers a callback to change_codec within the application, as shown below:

```
def change_codec(
    ccr_uuid: str,
    optimal_codec: str,
    change_ts: datetime,
    horizon_sec: Optional[int],
    improvement: float
)->None:
    #Logic to determine if the change should be accepted.
    . . .
    # Notify the cognitive network service as to whether
        the change has been accepted.
    api.control.notify(ccr_uuid, True)
```

The configuration change recommendations 528 may also be accompanied by different pieces of information, which may be incorporated by the application developer to deter-mine whether the change should be accepted and, if so, its effectuation:

The change timestamp provides an estimated timestamp as to when the change should be applied. The cognitive network will often attempt to provide a proactive recommendation (e.g., configuration change recom-mendations 528), so that the application can enact it before any disruption occurs. In some cases, the time-stamp can be in the past, which indicates that the proposed change could solve an on-going issue.

The recommendation horizon provides an estimated dura-tion (in seconds) of the recommendation. Indeed, the cognitive network may not always be capable of pro-viding such an estimate.

The expected improvement is a relative improvement value (e.g., 25%) for the said change.

The application may then use some logic to determine whether it enacts the change or not. In turn, it may notify the cognitive network service of its decision.

In various embodiments, cloud gateway 514 may be responsible for the registration, authentication, authorization of application endpoints (e.g., application client 504), col-lecting all metrics, events, feedbacks from the clients and application, and return configuration change recommenda-tions 528, as needed. In some implementations, cloud gate-way 514 may be distributed across different regions to ensure resilience and reliability.

Configuration change recommendations 528 can either target single target application clients (e.g., change the codec for a single user), or can be broadcast by cloud gateway 514 to groups of target application clients to allow for higher-level optimizations. For instance, a video conferencing service may be struggling to scale out media server capabilities in one region, and may need to slightly downgrade the codecs of a large set of users to avoid entering saturation regimes which would lead to more significant QoE disruptions for some users.

Note that routing change request 530 is also distinct from that of configuration change recommendations 528. Typically, configuration change recommendations 528 are not binding and can be ignored by the application, whereas a routing change request 530 may be enforceable via a network policy, although it may depend on the application.

The co-habitation of configuration change recommendations 528 and routing change request 530 is an important source of complexity: some network-level actions may be ineffective, or even counterproductive, depending on whether a particular one of configuration change recommendations 528 is enacted or not by a particular client or group of clients. For instance, consider a codec change, which would make the application more resilient to loss at the expense of a higher sensitivity to throughput (which is the case when using forward error correction): the choice of the codec must be made in association with the choice of the underlying network path. In such situations, the cloud gateway is responsible for identifying correlated instructions, and issue the corresponding routing change request 530 if and only if the configuration change recommendation has been accepted.

By way of a real-world example, a gaming application might use the CogNet SDK to notify the cognitive network about application requirements and changes. In the case of an online tournament, for instance, the application may notify the cognitive network service about the application's strict networking requirements for the latency. It will also allow for the tracking of the game frame per second changes, making sure those are still acceptable and notify cognitive network service about those values and unacceptable degradation. Soon, it might learn what the most optimal networking conditions are.

In another real-world example, automated stock exchange trading software used by hedge funds might employ the CogNet SDK, to make sure the desired network conditions are satisfied, trying to improve the experience of mobile traders and correlate the impact between changing network environments and decreased gains/losses from trading application. By having knowledge about both trading data and underlying networking resources, the system might recommend that the application be switched over to using a different mobile network.

Figure 6:
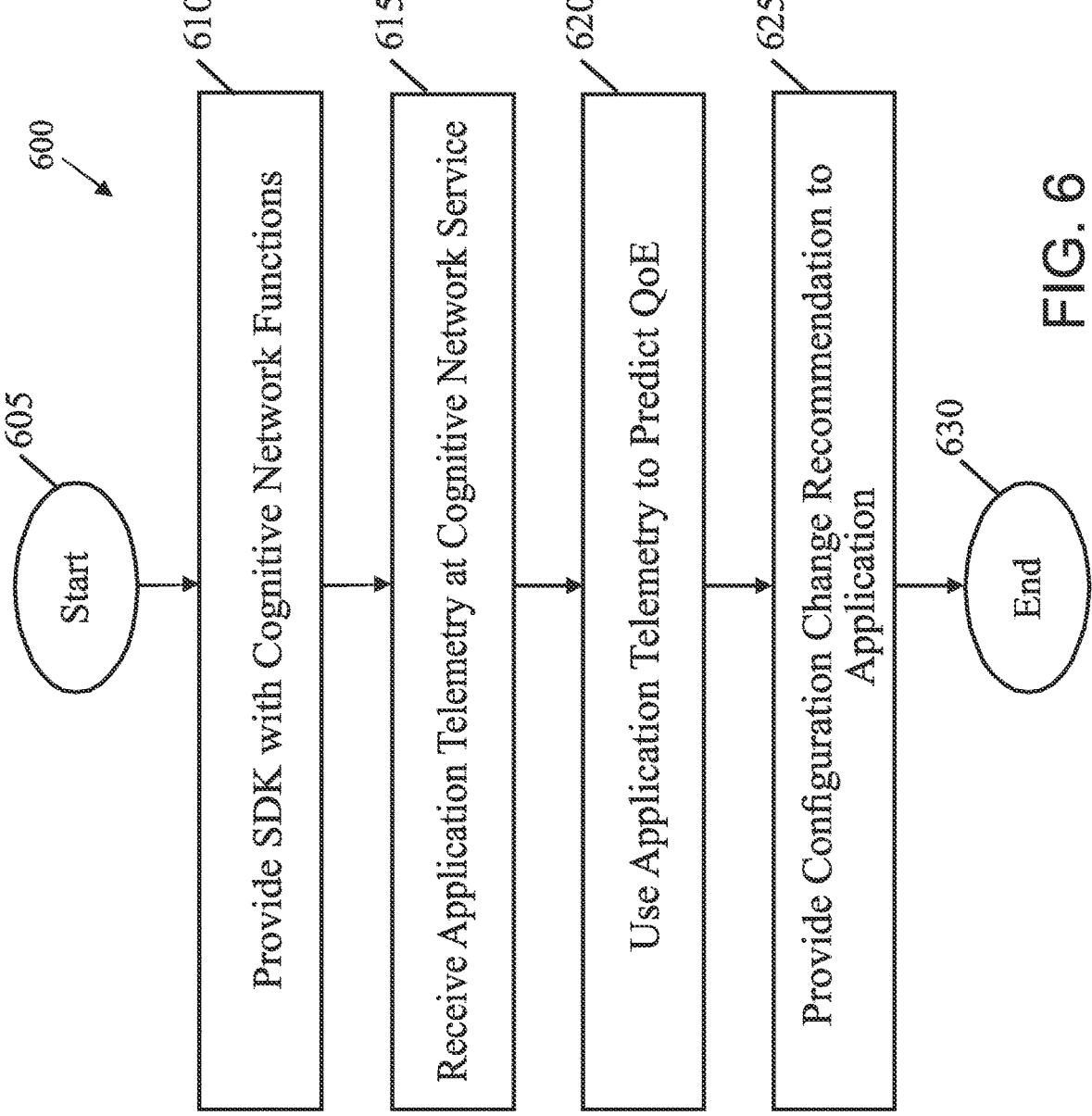
FIG. 6 illustrates an example simplified procedure for using an SDK to integrate an application with a cognitive network.

FIG. 6 illustrates an example simplified procedure 600 (e.g., a method) for using an SDK to integrate an application with a cognitive network, in accordance with one or more embodiments described herein. For example, a non-generic, specifically configured device (e.g., device 200), such as a router, firewall, controller for a network (e.g., an SDN controller or other device in communication therewith), server, or the like, may perform procedure 600 by executing stored instructions (e.g., application experience optimization process 248). In some instances, a set of distributed, specifically configured devices may also perform procedure 600, in which case the set of devices can themselves be viewed as a singular device for purposes of the teachings herein. The procedure 600 may start at step 605, and continues to step 610, where, as described in greater detail above, the device may provide a software development kit (SDK) that includes a set of functions for inclusion in an application developed using the SDK to communicate with a cognitive network service in a network. In some implementations, the application is a client-side application executed by an endpoint device in the network to access a corresponding online application. In further implementations, the application is a server-side application accessed by one or more endpoint devices in the network.

At step 615, as detailed above, the cognitive network service may receive application telemetry data from the application sent via the set of functions from the software development kit. In some implementations, the cognitive network service receives the application telemetry data via a gateway configured to register, authenticate, and authorize the application using the set of functions.

At step 620, the cognitive network service may use the application telemetry data from the application and network telemetry from the network as input to a prediction model to predict a quality of experience metric for the application, as described in greater detail above. In some cases, the application telemetry data is indicative of an event that occurred within the application. In further cases, the application telemetry data includes user-provided satisfaction ratings indicative of whether a user of the application was satisfied with their experience using the application.

At step 625, as detailed above, the cognitive network service may provide, based on the quality of experience metric predicted by the prediction model, a configuration change recommendation to the application via the set of functions. For instance, the configuration change recommendation may recommend that the application use a different codec. In some instances, the application uses the set of functions to determine whether to implement the configuration change recommendation. In turn, the cognitive network service may also receive an indication as to whether the application implemented the configuration change recommendation. In various implementations, the cognitive network service may also provide, based on the quality of experience metric predicted by the prediction model, a routing change recommendation to a networking device in the network to reroute traffic in the network associated with the application.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for using an SDK to integrate applications and cognitive networks, it is to be understood that various other adaptations and modifications may be made within the spirit and scope of the embodiments herein. For example, while certain embodiments are described herein with respect to using certain models for purposes of predicting application experience metrics (e.g., QoE metrics), SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   providing a software development kit that includes a set of functions for inclusion in an application developed using the software development kit, wherein the set of functions enable bidirectional communication between the application and a cognitive network service in a network;
   receiving, at the cognitive network service, application telemetry data from the application sent via the set of functions from the software development kit;
   using, by the cognitive network service, the application telemetry data from the application and network telemetry from the network as input to a prediction model to predict a quality of experience metric for the application; and
   providing, by the cognitive network service and based on the quality of experience metric predicted by the prediction model, a configuration change recommendation to the application via the set of functions from the software development kit, wherein the configuration change recommendation specifies a change to the operation of the application.

2. The method as in claim 1, wherein the application is a client-side application executed by an endpoint device in the network to access a corresponding online application.

3. The method as in claim 1, wherein the application is a server-side application accessed by one or more endpoint devices in the network.

4. The method as in claim 1, wherein the cognitive network service receives the application telemetry data via a gateway configured to register, authenticate, and authorize the application using the set of functions.

5. The method as in claim 1, further comprising:
   providing, by the cognitive network service and based on the quality of experience metric predicted by the prediction model, a routing change recommendation to a networking device in the network to reroute traffic in the network associated with the application.

6. The method as in claim 1, wherein the application uses the set of functions to determine whether to implement the configuration change recommendation.

7. The method as in claim 6, further comprising:
   receiving, at the cognitive network service, an indication as to whether the application implemented the configuration change recommendation.

8. The method as in claim 1, wherein the application telemetry data is indicative of an event that occurred within the application.

9. The method as in claim 1, wherein the application telemetry data includes user-provided satisfaction ratings indicative of whether a user of the application was satisfied with their experience using the application.

10. The method as in claim 1, wherein the configuration change recommendation recommends that the application use a different codec.

11. An apparatus, comprising:
   one or more network interfaces;
   a processor coupled to the one or more network interfaces and configured to execute one or more processes; and
   a memory configured to store a process that is executable by the processor, the process when executed configured to:
      provide a software development kit that includes a set of functions for inclusion in an application developed using the software development kit, wherein the set of functions enable bidirectional communication between the application and a cognitive network service in a network;
      receive, at a cognitive network service of the apparatus, application telemetry data from the application sent via the set of functions from the software development kit;
      use, by the cognitive network service, the application telemetry data from the application and network telemetry from the network as input to a prediction model to predict a quality of experience metric for the application; and
      provide, by the cognitive network service and based on the quality of experience metric predicted by the prediction model, a configuration change recommendation to the application via the set of functions from the software development kit, wherein the configuration change recommendation specifies a change to the operation of the application.

12. The apparatus as in claim 11, wherein the application is a client-side application executed by an endpoint device in the network to access a corresponding online application.

13. The apparatus as in claim 11, wherein the application is a server-side application accessed by one or more endpoint devices in the network.

14. The apparatus as in claim 11, wherein the cognitive network service receives the application telemetry data via a gateway configured to register, authenticate, and authorize the application using the set of functions.

15. The apparatus as in claim 11, wherein the process when executed is further configured to:
   provide, by the cognitive network service and based on the quality of experience metric predicted by the prediction model, a routing change recommendation to a networking device in the network to reroute traffic in the network associated with the application.

16. The apparatus as in claim 11, wherein the application uses the set of functions to determine whether to implement the configuration change recommendation.

17. The apparatus as in claim 16, wherein the process when executed is further configured to:
   receive, at the cognitive network service, an indication as to whether the application implemented the configuration change recommendation.

18. The apparatus as in claim 11, wherein the application telemetry data is indicative of an event that occurred within the application.

19. The apparatus as in claim 11, wherein the application telemetry data includes user-provided satisfaction ratings indicative of whether a user of the application was satisfied with their experience using the application.

20. A tangible, non-transitory, computer-readable medium storing program instructions that cause a device to execute a process comprising:

providing a software development kit that includes a set of functions for inclusion in an application developed using the software development kit, wherein the set of functions enable bidirectional communication between the application and a cognitive network service in a network;

receiving, at the cognitive network service, application telemetry data from the application sent via the set of functions from the software development kit;

using, by the cognitive network service, the application telemetry data from the application and network telemetry from the network as input to a prediction model to predict a quality of experience metric for the application; and providing, by the cognitive network service and based on the quality of experience metric predicted by the prediction model, a configuration change recommendation to the application via the set of functions from the software development kit, wherein the configuration change recommendation specifies a change to the operation of the application.

* * * * *